Figure 1:
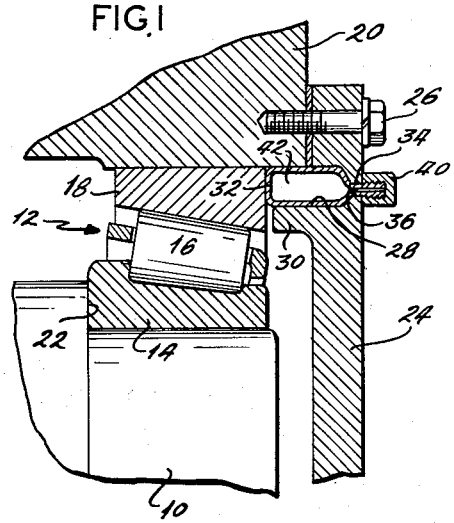

Feb. 21, 1961 J. B. BAKER 2,972,504
BEARING THRUST LOADER AND SEAL
Filed July 22, 1957

INVENTOR:
JOHN B. BAKER
By Gravely, Lieder, Woodruff and Wills
ATTORNEYS.

United States Patent Office 2,972,504
Patented Feb. 21, 1961

2,972,504

BEARING THRUST LOADER AND SEAL

John B. Baker, Canton, Ohio, assignor to The Timken Roller Bearing Company, Canton, Ohio, a corporation of Ohio Filed July 22, 1957, Ser. No. 673,321

13 Claims. (Cl. 308—207)

Attempts have heretofore been made to employ means for laterally loading bearing members. The known devices have been expensive to construct, requiring numerous intricate parts, and they have required frequent inspection and adjustment because of loss of hydraulic fluid and otherwise, and they have been relatively complicated to install. The present invention seeks to overcome these and other disadvantages with the known devices.

It is therefore a principal object of the present invention to provide relatively inexpensive means for laterally loading bearing members by hydraulic means.

Another important object of the present invention is to provide hydraulic means for loading bearing members which eliminate undesirable leakage of hydraulic fluid.

Another object of the present invention is to provide hydraulic means for sealing parts of a bearing assembly.

Another object is to provide means for axially loading bearing members hydraulically, which means are relatively simple to construct, to install, to adjust and to maintain.

Yet another object of the present invention is to provide hydraulic means for loading tapered bearing members and the like which can be readily installed as original equipment or as an improvement on existing equipment with minimum alteration and by relatively unskilled persons.

Briefly, the present bearing loader and seal comprises an expandable inflatable member mounted in a bearing assembly adjacent to one end of a tapered axially movable bearing member, said expandable member being inflatable so as to expand and move against the adjacent end of the bearing member to load said bearing member, said expandable member when inflated also sealably engaging the portions of the bearing assembly positioned adjacent thereto.

Other objects and advantages of the present invention will become apparent after considering the following detailed specification in conjunction with the accompanying drawing.

Figure 2:
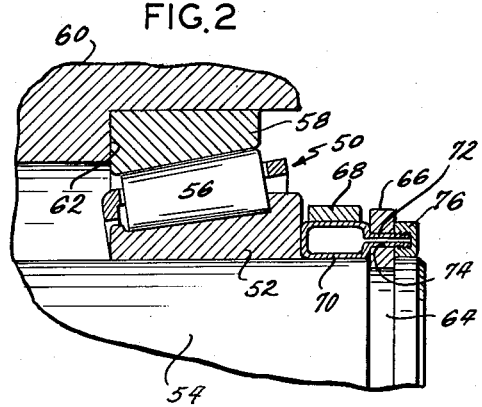

In the drawing:

Fig. 1 is a fragmentary cross-sectional view taken through the center of an anti-friction bearing assembly and illustrates one form of the present hydraulic loading and sealing means, and Fig. 2 is a fragmentary cross-sectional view showing a modified form of the bearing loading means of Fig. 1.

Referring to the drawing by reference numbers, number 10 in Fig. 1 refers to a journal member. An anti-friction bearing assembly 12; including a cone or tapered inner race 14, a ring of anti-friction rollers 16, and a cup or tapered outer race 18, is mounted on the journal 10. The outer race 18 is movable axially relative to the inner race 14 in a bearing housing 20 for loading the bearing members. The inner race 14 is mounted on the journal 10 against a backing shoulder 22, and is prevented from moving axially relative to the journal 10.

An end cap 24 is bolted to the housing 20 by bolts 26, and an annular groove 28 is formed in the end cap 24 opposite to the end surface of the outer race 18. An annular flange 30 is formed on the inner surface of the end cap 24 adjacent the groove 28 and extends inwardly therefrom toward the outer race 18. The outer surface of the flange 30 is coincident with the inner surface of the groove 28, and the groove 28, the flange 30, the outer race 18, and the adjacent portion of the housing 20 form an annular pocket or chamber.

Before the end cap 24 is bolted onto the housing 20, a hollow tubular member 32 is positioned in the groove 28, and when the end cap 24 is installed the tubular member is in the pocket. The hollow member 32 is constructed of a suitable resilient material such as synthetic rubber, aluminum, plastics, or similar material; and is provided with an inlet tube 34 which extends outwardly therefrom through an opening 36 in the end cap 24. The outer end of the tube 34 projects from the opening 36 and is threaded to receive a suitable cap 40. The cap 40 seals the inlet tube 34 against fluid leakage, and when removed exposes the tube 34, and provides convenient means for inflating the hollow member 32 with a suitable fluid 42 such as hydraulic fluid.

When the hollow member 32 is positioned in the groove 28 it is deflated making the installation thereof relatively simple. Being deflated also makes it relatively easy to attach the end cap 24 without damaging the member 32. After the end cap 24 is bolted to the housing 20, and with the cap 40 removed from the tube 34, fluid 42 is forced through the inlet tube 34 to fill and inflate the member 32. Sufficient fluid pressure is applied to swell the member 32 and to cause the member 32 to expand and push outwardly in all directions in the annular pocket. By so doing, the member 32 pushes endwardly against the outer race 18 thereby axially loading the bearing members, and at the same time seals the chamber forming members against possible loss of lubricant from the bearing assembly 12. The sealing action of the member 32 is important because it prevents or minimizes the loss of lubricating oil and thereby reduces the maintenance costs and prolongs the life of the bearing assembly 12.

Fig. 2 shows a modified form 50 of the bearing assembly 12. The modified assembly 50 has a cone or tapered inner race 52 mounted on a journal member 54, a ring of antifriction rollers 56 mounted on the inner race 52, and a cup or tapered outer race 58 which is mounted in a housing 60. The housing 60 has a shoulder 62 against which the outer race 58 bears and prevents axial movement thereof.

An annular outside groove 64 is formed in the journal member 54 outwardly of the inner race 52 and an annular locking ring 66 is positioned therein. An annular ring 68 is positioned between the locking ring 66 and the adjacent end of the inner race 52. The ring 68 has an inner diameter that is larger than the diameter of the journal member 54, and an axial dimension that is somewhat less than the distance between the locking ring 66 and the inner race 52 to provide for axial movement of the inner race 52.

An annular groove is formed between the locking ring 66, the adjacent end of the inner race 52, and the adjacent portion of the journal member 54; and the groove is partly enclosed by the ring 68. A hollow tubular member 70, similar to member 32 (Fig. 1), is positioned in the annular groove and has an inlet tube 72 which extends outwardly therefrom through an opening 74 formed in the locking ring 66. The projecting end of the tube 72 is threaded and is provided with a threaded cap 76 which is removed when the member 70 is being filled with fluid.

When the cap 76 is removed, the member 70 is filled with fluid and expands. As the member 70 expands it moves against the inner race 52 and axially loads the bearing members in substantially the same way as the hollow member 32 in Fig. 1. The principal difference between the modified assembly 50 and the assembly 12 (Fig. 1) is that the hollow member 70 in assembly 50 operates against the inner race 52 while the hollow member 32 in assembly 12 operates against the outer race 18.

Another difference between the modified assembly 50 and the assembly 12 is that the hollow member 70 in assembly 50 is used primarily to load and cushion the bearing members and does not seal the bearing members in a bearing chamber as does the hollow member 32.

It is also contemplated to use the present device to load both ends of the race members (not shown) and to employ the present device on a bearing structure in which the journal is fixed and the housing rotates. Furthermore it is contemplated that the present device could be used primarily as a seal between members instead of as a loading device, and still further it is anticipated that the present device could be used with assemblies having plain bearing members or any other type of anti-friction bearing structure.

It is now apparent that there has been provided novel means for laterally loading and sealing the bearing members of a bearing assembly which fulfills all of the objects and advantages sought therefor. It is to be understood, however, that the foregoing specification and the accompanying drawing have been presented only by way of illustration and example and that changes and alterations in the present disclosure which will be readily apparent to one skilled in the art are contemplated as within the scope of the invention which is limited only by the claims which follow.

What I claim is:

1. Means for loading relatively movable bearing members comprising a housing with a journal member rotatably mounted therein; a bearing assembly mounted on the journal member in the housing including an inner race, an outer race and antifriction members therebetween, one of said races being axially movable relative to the other for changing the loading therebetween; and an inflatable expandable member mounted adjacent to the axially movable race including a passage therein through which hydraulic fluid under pressure can be introduced into the inflatable member for expanding said member into engagement with and against the movable race to move the movable race in a direction to load the bearing assembly.

2. Means for loading relatively movable bearing members comprising a housing with a journal member rotatively mounted therein; a bearing assembly mounted on the journal in the housing including a tapered inner race fixedly mounted on the journal member, a tapered outer race mounted in the housing and axially movable therein relative to the inner race, and anti-friction members positioned therebetween; an annular groove formed in the housing adjacent to one end of the outer race; and an expandable, inflatable member positioned in the annular groove, said member having a tubular inlet port that projects outwardly from the housing through which hydraulic fluid can be introduced into said member to expand said member against the outer race in a direction to load the bearing assembly, said inflatable member substantially entirely filling the annular groove when in inflated condition to apply uniform loading over the end of the outer race engaged thereby.

3. Means for loading relatively movable bearing members comprising a housing with a journal member rotatively mounted therein; a bearing assembly mounted on the journal member in the housing including a tapered inner race fixedly mounted on the journal member, a tapered outer race mounted in the housing and axially movable relative to the inner race, and anti-friction members positioned therebetween; an end cap secured to the housing adjacent to the bearing assembly, said end cap having an annular groove formed therein adjacent to an end of the outer race; and an expandable, inflatable member positioned in the annular groove, said member having an inlet port through which hydraulic fluid is introduced into said member to expand said member outwardly from the groove into loading engagement with the outer race, said expanding, inflatable member also engaging the housing and sealing said housing to the end cap.

4. Means for loading relatively movable bearing members comprising a housing with a journal member rotatively mounted therein; a bearing assembly mounted on the journal member in the housing including a tapered outer race fixedly mounted in the housing, a tapered inner race mounted on the journal member and axially movable relative to the outer race, and anti-friction members positioned therebetween; a thrust member secured to the journal member and spaced axially from the inner race; an annular member of greater diameter than the journal member positioned around the journal member between the thrust member and the inner race; and an annular expandable, inflatable member positioned between the thrust member and on surface of the inner race and between the journal member and the annular member, said expandable, inflatable member having an inlet port which extends outwardly through the thrust member through which relatively incompressible fluid is introduced to expand said member so as to apply substantially uniform pressure to said one surface of the inner race in a direction to move the inner race on the journal member into load carrying engagement with the anti-friction members and the outer race.

5. In a bearing structure; a housing; a journal member in said housing; an anti-friction bearing assembly having an outer race mounted in the housing, an inner race mounted on said journal, and bearing rollers movably positioned therebetween, said outer race being movable axially relative to the inner race for loading the bearing assembly; means forming a chamber at one end of said outer race, and an inflatable member positioned in said chamber including an inlet port projecting outwardly therefrom, said inlet port enabling hydraulic fluid to be introduced into said expandable member to expand said member to stubstantially completely fill said chamber and to move against the outer race in a direction to load the bearing assembly; said inlet port having means therefor to prevent the loss of fluid from the expandable member during normal operation of the bearing structure.

6. In a bearing structure; a housing; a journal in said housing; an anti-friction bearing assembly having an outer race mounted in the housing, an inner race mounted on said journal, and bearing rollers movably positioned therebetween, said inner race being movable axially relative to the outer race for loading the bearing assembly; chamber means formed in the journal member adjacent to one end surface of the inner race; and an inflatable member positioned in said chamber including an inlet port projecting outwardly therefrom, said inlet port enabling hydraulic fluid to be introduced into said expandable member to expand said member in the chamber until said member substantially fills the chamber and exerts uniform pressure against the said one end surface of the inner race in a direction to load the bearing assembly; said inlet port having closure means therefor to prevent loss of fluid from the expandable member during normal operation of the bearing structure.

7. A device for absorbing axial shocks on bearing members comprising a housing; a journal rotatively mounted in said housing; an anti-friction bearing assembly having an outer race mounted in the housing, an inner race mounted on the journal and bearing rollers movably positioned therebetween, said inner and outer races being movable axially relative to each other; an annular chamber formed in the housing adjacent to the outer race; and an inflatable, expandable member inflated by a relatively incompressible fluid positioned in said chamber and extending outwardly therefrom into engagement with the outer race and exerting uniform pressure thereon in a direction to load the bearing members and to dampen relative axial movement therebetween.

8. A device for absorbing axial shocks on bearing members comprising a housing; a journal rotatively mounted in said housing; an anti-friction bearing assembly having an outer race mounted in the housing, an inner race mounted on the journal, and bearing rollers movably postioned therebetween, said inner and outer races being axially movable relative to each other for loading the bearing members; an annular chamber formed in the journal adjacent to the inner race, and an inflatable, expandable member filled with a relatively incompressible fluid positioned in said chamber and extending outwardly therefrom into engagement with the inner race and exerting uniform pressure thereon in a direction to load the bearing members and dampen relative axial movement therebetween.

9. In a bearing assembly including a journal race, a housing race and tapered rollers between said races permitting relative movement between said journal race and housing race in the axial direction of the bearing assembly, the improvement therein of means adapted to initially positively adjust the relative axial movement of said races for determining the operating thrust of tapered rollers, said means comprising an expandable cell inflated with a relatively incompressible fluid positioned in the bearing assembly abutting one of said races, expansion of said cell by said fluid exerting uniform pressure in an axial direction substantially about the periphery of said one race in a direction to load the bearing assembly.

10. The improvement as set forth in claim 9, wherein said expandable cell is substantially confined against expansion in a direction normal to the axial direction of adjustment.

11. Means for loading relatively movable bearing members comprising a journal member with a housing rotatively mounted thereon; a bearing assembly mounted on the journal member in the housing including a tapered inner race fixedly mounted on the journal member, a tapered outer race mounted in the housing and axially movable relative to the inner race, and anti-friction members positioned therebetween; an end cap secured to the housing adjacent to the bearing assembly, said end cap having an annular groove formed therein adjacent to an end of the outer race; and an expandable inflatable member positioned in the annular groove, said inflatable member having an inlet port through which hydraulic fluid is introduced into said member to expand said member until said member fills the groove and moves outwardly from the groove and against the outer race, said member upon being inflated applying uniform pressure on the engaged end of the outer race in a direction to load the bearing assembly, said expandable, inflatable member also engaging the housing and sealing said housing to the end cap.

12. Means for loading relatively movable bearing members comprising a journal member having a housing rotatively mounted thereon; a bearing assembly mounted on the journal member including a tapered outer race fixedly mounted in the housing, a tapered inner race mounted on the journal member and axially movable thereon relative to the outer race, and anti-friction members positioned therebetween; a thrust member secured to the journal member and spaced axially from the inner race; an annular member of greater diameter than the journal member positioned around the journal member in the space between the thrust member and the inner race; and an expandable, inflatable member positioned between the thrust member and inner race and between the journal member and the annular member, said expandable, inflatable member having an inlet port which extends outwardly therefrom through which hydraulic fluid under pressure is introduced to expand said inflatable member against the inner race and other adjacent members, said inflated member applying uniform pressure to the engaged area of the inner race in a direction to move the inner race on the journal member into load carrying engagement with the anti-friction members and the outer race.

13. A seal for a bearing structure comprising a housing, a journal member mounted in said housing, relatively movable tapered bearing members mounted between said housing and said journal member, an end cap for said housing including chamber means formed therein adjacent to the housing, and an inflatable, expandable member positioned in said chamber having an inlet port which extends outwardly therefrom, said inlet port enabling hydraulic fluid to be introduced into said member for expanding said member into sealing engagement with said end cap and said housing and for axial movement outwardly from said chamber for engagement with one of said relatively movable tapered bearing members.

References Cited in the file of this patent

UNITED STATES PATENTS

| | | |
|---|---|---|
| 1,730,896 | Norton | Oct. 8, 1929 |
| 1,982,265 | Nenninger | Nov. 27, 1934 |
| 2,559,564 | Sperling | July 3, 1951 |

FOREIGN PATENTS

| | | |
|---|---|---|
| 219,233 | Switzerland | Mar. 16, 1942 |